United States Patent
Somayazulu et al.

(10) Patent No.: US 9,572,079 B2
(45) Date of Patent: Feb. 14, 2017

(54) INTELLIGENT INTEGRATION OF MMWAVE TECHNOLOGY IN A HETEROGENEOUS WIRELESS COMMUNICATION SYSTEM

(75) Inventors: Vallabhajosyula Z. Somayazulu, Portland, OR (US); Carlos Cordeiro, Portland, OR (US); Guoqing Li, Portland, OR (US); Bahareh Bahar Sadeghi, Portland, OR (US); Ali S. Sadri, San Diego, CA (US)

(73) Assignee: INTEL CORPORATION, Santa Clara, CA (US)

( * ) Notice: Subject to any disclaimer, the term of this patent is extended or adjusted under 35 U.S.C. 154(b) by 180 days.

(21) Appl. No.: 13/996,639

(22) PCT Filed: Dec. 15, 2011

(86) PCT No.: PCT/US2011/065117
§ 371 (c)(1),
(2), (4) Date: Apr. 11, 2014

(87) PCT Pub. No.: WO2013/089733
PCT Pub. Date: Jun. 20, 2013

(65) Prior Publication Data
US 2015/0245251 A1  Aug. 27, 2015

(51) Int. Cl.
*H04W 36/32* (2009.01)
*H04W 88/06* (2009.01)
(Continued)

(52) U.S. Cl.
CPC ............ *H04W 36/32* (2013.01); *H04W 16/28* (2013.01); *H04W 28/18* (2013.01); *H04W 72/08* (2013.01);
(Continued)

(58) Field of Classification Search
CPC ...... H04W 28/00; H04W 28/02; H04W 28/08; H04W 76/00; H04W 76/025; H04L 29/04; H04L 29/06088; H04L 47/24
See application file for complete search history.

(56) References Cited

U.S. PATENT DOCUMENTS

2005/0048921 A1  3/2005  Chung et al.
2006/0111149 A1  5/2006  Chitrapu et al.
(Continued)

FOREIGN PATENT DOCUMENTS

WO  2013/089731 A1  6/2013
WO  2013/089733 A1  6/2013

OTHER PUBLICATIONS

International Search Report and Written Opinion received for PCT Patent Application No. PCT/US2011/065117, mailed on Jul. 25, 2012, 9 pages.
(Continued)

*Primary Examiner* — Gary Mui
*Assistant Examiner* — Stephen Steiner
(74) *Attorney, Agent, or Firm* — Ellis B. Ramirez; PRASS LLP

(57) ABSTRACT

A system and method are provided for intelligently incorporating a mmWave communication link in a heterogeneous cellular/Wi-Fi networking environment. The combination improves overall data transmission capacity of the heterogeneous networking environment, and also provides superior user Quality of Experience. The combination of the mmWave communication link with the cellular/Wi-Fi communication system is integrated in a synergistic manner that allows each of the individual communication technologies to complement the other. Using highly-directional beamforming antennas the mmWave communication link provides wide area network coverage by deploying a plurality of
(Continued)

directional beams in sectors to complement the coverage area of the wide area network systems operating in other frequency bands.

11 Claims, 4 Drawing Sheets

(51) Int. Cl.
    *H04W 28/18*     (2009.01)
    *H04W 16/28*     (2009.01)
    *H04W 72/08*     (2009.01)
    *H04B 7/06*     (2006.01)
    *H04W 84/12*     (2009.01)

(52) U.S. Cl.
    CPC ............ *H04W 88/06* (2013.01); *H04B 7/0617* (2013.01); *H04W 84/12* (2013.01)

(56) References Cited

U.S. PATENT DOCUMENTS

| | | |
|---|---|---|
| 2007/0249402 A1 | 10/2007 | Dong et al. |
| 2008/0194204 A1 | 8/2008 | Duet et al. |
| 2009/0213901 A1* | 8/2009 | Berens .................. H04B 10/90 375/130 |
| 2010/0027494 A1 | 2/2010 | Kwon et al. |
| 2010/0080197 A1* | 4/2010 | Kanellakis ............ H04W 48/18 370/338 |
| 2010/0130138 A1 | 5/2010 | Nandagopalan et al. |
| 2011/0182174 A1* | 7/2011 | Pi ........................... H04W 88/10 370/229 |
| 2012/0057511 A1* | 3/2012 | Sivakumar ............ H04W 28/06 370/310 |
| 2014/0140426 A1* | 5/2014 | Dinur ................... H04B 7/0404 375/267 |
| 2014/0218236 A1 | 8/2014 | Sadeghi et al. |

OTHER PUBLICATIONS

Lee, "Transmission Modes for Multi-Radio Access in Hierarchical Networks", IEEE 802.16 Broadband Wireless Access Working Group, IEEE C802.16ppc-II_0015, Nov. 5, 2011, See slides 2-3.
Project Planning Committee, "Hierarchical Network Study Report", IEEE 802 .16 Broadband Wireless Access Working Group ,IEEE 802. 16ppc-II / 0004r2, Nov. 9, 2011. See sections 2.2, 3 and 4.
International Search Report and Written Opinion received for PCT Patent Application No. PCT/US2011/065110, mailed on Aug. 31, 2012, 8 pages.
International Preliminary Report on Patentability and Written Opinion received for PCT Patent Application No. PCT/US2011/065110, mailed on Jun. 26, 2014, 5 pages.
International Preliminary Report on Patentability and Written Opinion received for PCT Patent Application No. PCT/US2011/065117, mailed on Jun. 26, 2014, 6 pages.

* cited by examiner

INTELLIGENT INTEGRATION OF MMWAVE TECHNOLOGY IN A HETEROGENEOUS WIRELESS COMMUNICATION SYSTEM

BACKGROUND

This application is related to a co-pending U.S. patent application US 20140218236 A1 filed on the same day as this application, the disclosure of which is hereby incorporated herein by reference in its entirety.

1. Field of the Disclosed Embodiments

This disclosure relates to systems and methods for integrating a mmWave communication link into a heterogeneous cellular/Wi-Fi communication system to provide users with the benefits of synergistic application of mmWave technology with the other communication technologies in a network environment.

2. Related Art

Commercial wireless telephony worldwide has undergone several generational changes since its introduction. The capabilities of the earliest mobile telephone devices were generally limited to making domestic telephone calls within limited coverage areas. As the capacity and coverage areas of commercial wireless telephone carriers increased, so too did the capacity and capability of the individual hand-held cellular telephone devices, even as the physical size of these devices decreased. These devices operated then, and continue to operate, in the licensed spectrum where service providers generally seek to provide a certain Quality of Experience (QoE) to their users.

Separately, wireless computing technologies have emerged and matured. Developments in this area of wireless communication technology have equally expanded well beyond the initial capacity to allow, for example, one computer to wirelessly communicate with another computer in a wireless local area network (WLAN) environment. The advancements in this wireless communication technology area have led to dramatic increases in the availability of wireless access points and application providers providing tremendously capable application for wireless devices accessing networks via the available wireless access points.

For a long time, each of the above commercial communication technology efforts were developed and refined separately, each directed at meeting a certain reasonably specific set of communicating requirements. In this regard, each of what are now generally viewed as closely-related technologies matured as largely separate homogeneous communication techniques.

More recently, with the extensive increase in the numbers and types of wireless client devices accessing all manner of wireless networks via various communication paths, the separate technologies that were developed in the general field of wireless communications have been merged to some extent. Current wireless client devices are loaded with far-reaching and increasingly capable libraries of individual applications that provide the wireless client devices with the capacity to undertake all manner of tasks in communication with wireless networks and commercial communication networks to which the wireless client devices gain access by the various paths communication paths or links.

Current commercially-available wireless hand-held client devices such as, for example, smartphones, tablets, PDAs and the like, are able to access commercially available wireless networks in the licensed spectrum for cellular telephone communication and other purposes, as well as accessing local wireless access points with integral wireless receivers in the wireless client devices for short range communication in the unlicensed Wi-Fi spectrum. A single wireless client device is able to employ separate radios to make use of separate and diverse communication paths or links as a heterogeneous communicating device combining the benefits of the communication technology in a seemingly integrated manner to benefit the user of the wireless client device.

The future of wireless network communication and electronic communication, in general, will likely take place in an increasingly heterogeneous communicating environment. Sample individual communication links to which heterogeneous wireless hand-held client devices currently gain access include wireless local/metropolitan access networks (WLANs/WMANs), cellular telephone networks, Bluetooth® networks and the like. Efforts to date have centered on developing individual wireless client devices that have capabilities to access these differing network technologies that include communications that are broadcast omnidirectionally. A drawback in these systems, as currently fielded, is their inability to cope with rapidly accelerating demands for increasing data throughput.

Millimeter Wave (mmWave) communication provides a currently-available communication technology available to address the above shortcoming. Transmitting, for example, in the 60 GHz wavelength range offers extremely high data throughputs as a result of the ultra-wide bandwidth available. A tradeoff is that communications in this frequency range are highly directional with directional antenna beam forming arrays being required to sustain reasonable transmission distances based on the atmospheric absorption of the transmitted RF energy. This is at once an advantage and a drawback of the use of mmWave technology for certain applications. An ability to provide secure, straight-line, high data rate communications is a significant plus. This is balanced by the need to constantly reshape the transmission beam through some manner of beamforming when communicating with a mobile receiver, as is generally the case when communicating with wireless hand-held client devices. The beamforming effort itself requires significant computing overhead.

SUMMARY OF THE DISCLOSED EMBODIMENTS

Future wireless network communications technologies will continue seek to exploit further developments in heterogeneous wireless communications in a single client device. It would be advantageous to provide a system and a method for intelligently combining the capabilities of the various communicating technologies so that the single client device could access a network infrastructure with expanded capacity in a manner that best supports the communicating requirements of the user of the single client device, and makes most efficient use of multiple available communication paths or links by which the single client device may communicate the network infrastructure. Optimization of these resources may provide increased user QoE. Expanding the current heterogeneous cellular/Wi-Fi networking capability to include a properly integrated and exploited mmWave communication link will allow users to benefit from the unique features of different communication links. This will provide significantly increased value to the users and carriers alike.

In various exemplary embodiments, the systems and methods according to this disclosure may incorporate mmWave communication paths in a current heterogeneous cellular/Wi-Fi networking environment.

In various exemplary embodiments, the systems and methods according to this disclosure may integrate mmWave communications into a client device in a manner similar to the current integration between cellular technology and Wi-Fi technology in order that the user may take full advantage of all of the available communicating technologies.

In various exemplary embodiments, the systems and methods according to this disclosure may intelligently combine mmWave communication links with cellular telephone communication links or other electronic communication links such as, for example, Wi-Fi, in order to improve overall capacity of the heterogeneous networking environment, and also to provide superior user QoE.

In various exemplary embodiments, the systems and methods according to this disclosure may implement the combination of mmWave communication with cellular/Wi-Fi communication in a synergistic manner that allows each of the individual communication technologies to complement the others. In many cases, the synergistic effect may be realized by exploiting the strengths of each individual communication technique, or otherwise by mitigating weaknesses of an individual communication technique by employing a different communication technique that better addresses the immediate user requirement.

In various exemplary embodiments, the systems and methods according to this disclosure may take specific advantage of the next generation mmWave communicating systems, using highly directional beamforming antennas, in order to provide wide area network coverage. The mmWave system employed in this manner will complement the coverage area of the wide area network systems operating in other frequency bands.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for integrating a mmWave communication link in a heterogeneous cellular/Wi-Fi communication system will be described, in detail, with reference to the following drawings, in which.

DETAILED DESCRIPTION OF THE DISCLOSED EMBODIMENTS

The systems and methods for integrating a mmWave communication link into a heterogeneous cellular/Wi-Fi communication system will generally refer to this specific utility for those systems and methods. Exemplary embodiments described and depicted in this disclosure should not be interpreted as being specifically limited to any particular combination of communicating capabilities in a single network node, or to any specific system infrastructure or client device configuration, or directed to any particular intended use for the described network infrastructure, network node, or client device. In fact, any selective transmission scheme for intelligently integrating multiple communicating technologies, including integrating generally omnidirectional communications with highly directional beamformed communications in a heterogeneous network communication system, and any complementary configuration for a wireless client device for employment in that system, that may benefit from the systems and methods according to this disclosure is contemplated.

Specific reference to, for example, any particular wireless client device should be understood as being exemplary only, and not limited, in any manner, to any particular class of client devices. The systems and methods according to this disclosure will be described as being particularly adaptable to being hosted on commercially-available hand-held wireless client devices ("client device") such as smartphones, tablets, PDAs and the like, but should not be considered as being limited to only these classes of client devices.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized and obtained by means of the individual elements, and combinations of those elements, as particularly pointed out in the appended claims. While specific implementations are discussed, it should be understood that this is done for illustration purposes only. A person skilled in the relevant art will recognize that other components and configurations may be used without departing from the spirit and scope of the subject matter of this disclosure.

Various aspects of the disclosed embodiments relate to systems for integrating a mmWave communication link into a heterogeneous cellular/Wi-Fi communication system and methods for operating such a combined communication system, as well as a corresponding non-transitory computer-readable medium having recorded on it a program that, when executed by a processor causes the processor to execute the steps of the method for intelligently operating a system integrating a mmWave communication link into a heterogeneous cellular/Wi-Fi communication system.

Figure 1:
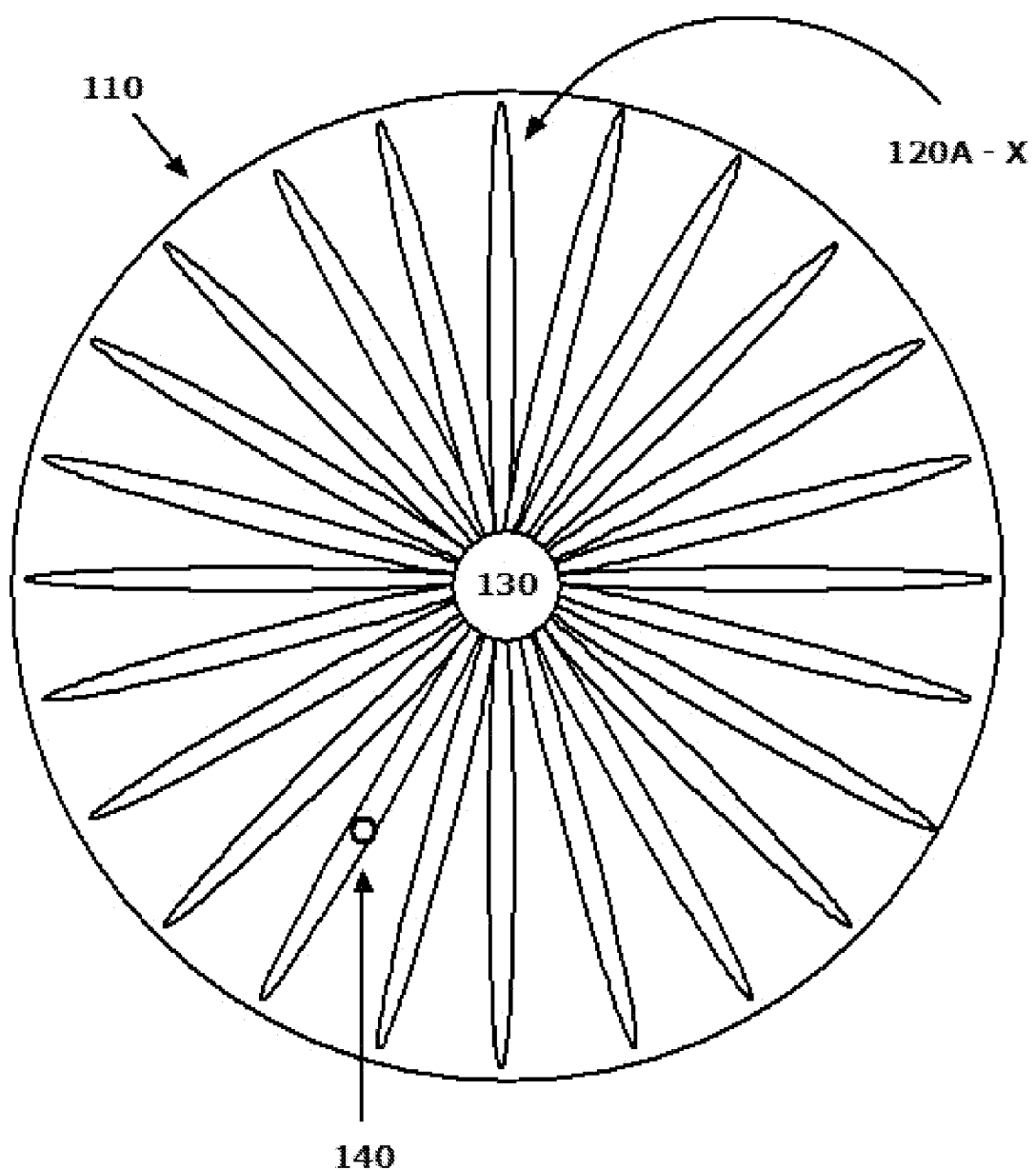
FIG. 1 illustrates an overview of an exemplary system and antenna coverage pattern for an integrated mmWave and cellular/Wi-Fi communicating system according to this disclosure.

FIG. 1 illustrates an overview of an exemplary system and antenna coverage pattern for an integrated mmWave and cellular/Wi-Fi communicating system according to this disclosure. As shown in FIG. 1, a coverage area of, for example, a conventional heterogeneous cellular/Wi-Fi communication system is indicated by the omnidirectional antenna pattern 110 centered around network node 130. In order to provide complementary coverage in the area covered by the conventional heterogeneous cellular/Wi-Fi communication system, a mmWave communication system may be employed using highly directional beamforming antennas in order to provide coverage over the same area. An example of such coverage is depicted as the multiple sectorized directional beam patterns 120A-X in FIG. 1. These multiple sectorized directional beam patterns 120A-X may provide coverage in essentially the same area as the omnidirectional antenna pattern 110, or in another overlapping area, in order to service one or more client devices, depicted as a single client device 140, with heterogeneous multi-communication link connectivity. In this manner, in a same coverage area, a client device 140 including, for example, a 3G communication capability, and a mmWave communication capability may exploit the capabilities of each of the separate communication paths or links in an intelligent manner to complement each other. The combination of a 3G communication capability and a mmWave communication capability should be considered as exemplary only. Other combinations are possible.

Employing ultra-wide bandwidth and the high gain narrow beam formed antennas, especially at the base station (or eNodeB, as appropriate) such as network node 130 may create an opportunity for extended range of the high data rate mmWave communications. It is recognized, however, that the highly directional beam patterns may experience difficulty when used by a highly mobile user of client device 140 as that user moves through the combined coverage area. The directional beams must either be adapted at a high enough rate to track such a mobile user or the user may experience handoffs between different sectors. Intelligent employments of the multiple communication links according to the disclosed systems seeks to limit user interruption and improve QoE for the user as these sector transitions occur.

The intelligent integration of a mmWave communication link in the heterogeneous coverage area 110 depicted in FIG. 1 creates the opportunity to exploit the capabilities of each of the communication techniques in a coordinated manner.

A network node 130, an exemplary composition of which will be described in greater detail below, may react to a client request and optimize the communication link between the network node 130 and the client device 140 by which to deliver the requested data to the client device 140. For example, a user of a client device 140 may indicate a desire to execute an application demanding a very large sustained bandwidth, or otherwise an application that calls for a very large file transfer such as, for example, a movie download. The cellular link may be used to set up the transaction and to execute, for example, control plane messaging, billing or other low data rate or low volume transfer requirements, reserving the high data rate mmWave communication link for only those applications that would benefit from its use.

The cellular link may also be used to, for example, isolate a position of the client device 140. This isolation may occur through crosstalk between the network node 130 and client device 140. For example, the client device 140 may identify its own position by using a position locating device or capability resident within the client device 140. The client device 140 may then transmit information regarding its own identified position to network node 130. Having obtained position information regarding the client device 140, by the above manner or otherwise, the network node 130 may select the one of the multiple sectorized directional beam patterns 120 A-X within which the client device 140 is located, or may otherwise steer a nearest one of the multiple sectorized directional beam patterns 120A-X to cover a position of the client device 140 in order that a mmWave communication link between the network node 130 and the client device 140 may optimally offload the large data package requested by the client device 140. In this manner, spectrum usage can be optimized between the communications capabilities of the network system leaving the cellular communication link less affected by applications which demand heavy bandwidth.

In the same manner that heavy bandwidth applications may be directed to a great extent to the mmWave communication link, so too may the network node 130 further optimize use of the network architecture by, for example, ensuring that applications requiring lower bandwidth are directed and reserved to the cellular communication link. In this regard, network caching of different data types and volumes can be split into different locations in the network architecture to optimally exploit the different communications links within the disclosed heterogeneous network. Intelligent server design may follow from the separate caching scheme in order that the network node 130 is optimized for data throughput via the various communication links according to their differing capabilities.

The above-discussed concept of the network node 130 intelligently integrating with client device 140 to optimize resources between the mmWave communication link and the cellular communication link in the network architecture based on crosstalk with the client device 140 may be further expanded depending on the nature of the client device 140. While this disclosure is generally directed at a client device 140 that is wireless, portable, and particularly hand-held, other configurations of the client device 140 are contemplated. As noted above, beamforming in a mmWave communication link requires significant computing overhead for a moving client device 140, as opposed to a fixed client device 140. The computing overhead would be significantly reduced for a client device 140 that was at a fixed position with respect to the network node 130 at least for the duration of any data download from the network node 130 to the client device 140 via the mmWave communication link. For fixed client devices 140, existing beamforming mechanisms within standalone mmWave communication links are adequate. Further assistance from the combined network architecture may assist in handling a mobile user employing the client device 140 while on the move to attempt to mitigate the significant increase in computing overhead for re-beamforming.

The network architecture of the integrated mmWave and cellular/Wi-Fi communicating system depicted in FIG. 1 with fixed directions antenna beamforming patterns may advantageously employ position keeping of the client device 140, as described above, to facilitate handover of the client device 140 from one beam sector to another in an effort to minimize mmWave signal interruption as the client device 140 traverses between sectors.

In order to anticipate in which of the above modes a particular client device 140 may be operated, a cooperating client device 140, optimized for use in the depicted exemplary integrated mmWave and cellular/Wi-Fi communicating system, may provide an indication to the network node 130 regarding its classification as a "fixed" or "mobile" client device 140.

Further, in the depicted exemplary integrated mmWave and cellular/Wi-Fi communicating system with fixed directional beamforming patterns for the mmWave communication link, a user of a "mobile" client device 140 will experience some handoff from one sector to another sector of the mmWave communication link as the client device 140 moves through the cover area. The cellular/Wi-Fi communication link to the "mobile" client device 140 may provide consistent coverage across the handoffs between sectors. As such, the depicted exemplary integrated mmWave and cellular/Wi-Fi communicating system may exploit the continuity of cellular service to make the handoff process essentially seamless with minimum impact on the QoE of the user of the "mobile" client device 140. The network node 130 may employ the cellular communication link to communicate with the "mobile" client device 140 to obtain feedback in order to aid the network node 130 in determining whether, or how most appropriately, to switch the "mobile" client device 140 to a new sector of the mmWave communication link.

Finally, extended range operation of the mmWave communication link requires very highly directional beamforming arrays leading to the practical constraints that, as discussed above, may be mitigated through operation of the disclosed integrated mmWave and cellular/Wi-Fi communicating system. The network node 130 may further take advantage of the fact that application data requirements can be highly asymmetric. In other words, data downlink rates from the network node 130 to the client device 140 can be much higher in general that data uplink rates from the client device 140 to the network node 130. The disclosed integrated mmWave and cellular/Wi-Fi communicating system may take advantage of this asymmetry by reserving to the mmWave communication link only high-speed downlink applications such as file streaming and/or large file downloads from the network node 130 to the client device 140. Low rate acknowledgments, and other low rate data transfer requirements, for example, from the client device 140 to the network node 130 may remain on the cellular link.

Figure 2:
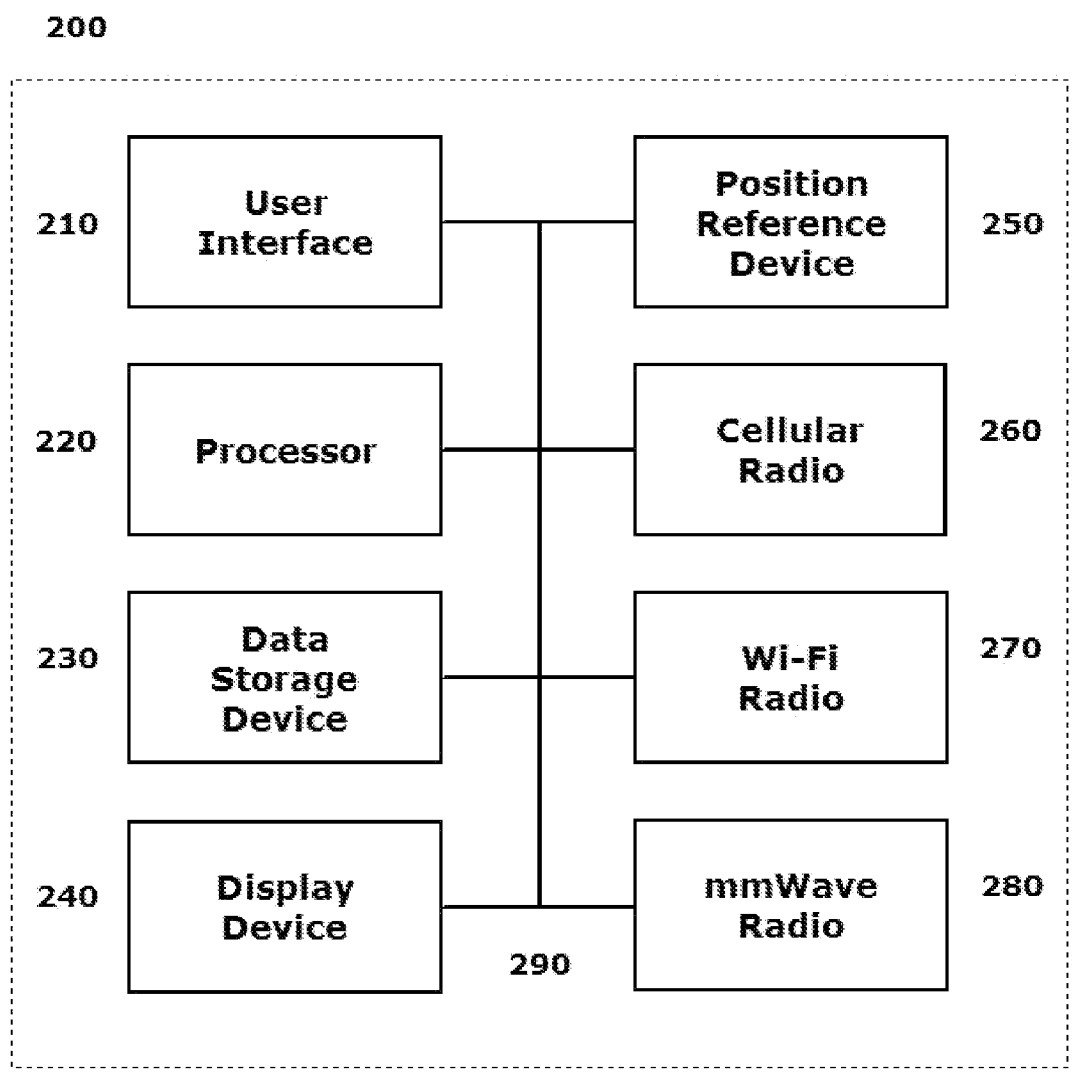
FIG. 2 illustrates a block diagram of an exemplary client device that integrates a mmWave communication capability into a heterogeneous cellular/Wi-Fi wireless device according to this disclosure.

FIG. 2 illustrates a block diagram of an exemplary client device 200 that integrates a mmWave communication capability into a heterogeneous cellular/Wi-Fi wireless device according to this disclosure. The client device 200 may be, for example, a smartphone, tablet, PDA or other like mobile device. The client device 200 may otherwise be a substantially fixed wireless unit.

The client device 200 may include a user interface 210 by which the user can communicate with the client device 200, and may otherwise communicate information via the client device 200 to a network node 130 (see FIG. 1) with which the client device 200 is in wireless communication. The user interface 210 may be configured as one or more conventional mechanisms that permit a user to input information to the client device 200. The user interface 210 may include, for example, an integral keyboard, or a touchscreen with "soft" buttons for communicating commands and information to the client device 200. The user interface 210 may alternatively include a microphone by which a user may provide oral commands to the client device 200 to be "translated" by a voice recognition program or otherwise. The user interface 210 may otherwise include any other like device for user operation of, and data exchange with, the client device 200. A user may make inputs via the user interface 210 to provide information to the network node, or to respond to inquiries from the network node. Information sent to the network node may include requests for data delivery to the client device 200. When queried, the user interface 210 may provide the user the opportunity to indicate to the network node whether the client device 200 is being operated in a "fixed" or "mobile" mode.

The client device 200 may include one or more local processors 220 for individually undertaking the processing and control functions that are carried out by the client device 200. Processor(s) 220 may include at least one conventional processor or microprocessor that interprets and executes instructions and processes outgoing and incoming data via the different communication links in the heterogeneous system according to the methods of this disclosure.

The client device 200 may include one or more data storage devices 230. Such data storage device(s) 230 may be used to store data, and operating programs or applications to be used by the client device 200, and specifically the processor(s) 220. Data storage device(s) 230 may include a random access memory (RAM) or another type of dynamic storage device that stores information and instructions for execution by the processor(s) 220. Data storage device(s) 230 may also include a read-only memory (ROM), which may include a conventional ROM device or another type of static storage device that stores static information and instructions for execution by the processor(s) 220. The data storage device(s) 230 will generally be those that are integral to the client device 200, and not some other data storage device, as will be described in detail below, that may be provided external to, and in wireless communication with, the network node. The data storage device(s) 230 may store condition information regarding the communication link capabilities of the client device 200, as well as information on a default operating mode, i.e. fixed or mobile, that may be shared with a network node, for example, upon request by the network node. At least one data storage device 230 may be configured to store data received via the mmWave communication link for use by the client device 200. Storage in this at least one data storage device 230 may be static or dynamic as determined by, for example, the processor(s) 220.

The client device 200 may include at least one data display device 240 which may be configured as one or more conventional mechanisms that display information to the user of the client device 200 for operation of the client device in its various operating modes, or otherwise for displaying, for example, streaming data received via the mmWave communication link, or data received otherwise via any communication link with which the client device 200 is using.

The client device 200 may include one or more position reference devices 250. Such position reference devices 250 may comprise, for example, a GPS receiver for receiving GPS location information by the client device 200, and/or may include an inertial navigation unit or other like device that can localize a position of the client device 200 for use. The client device 200 may be able to provide, upon request, location information for a current location of the client device 200 in a cellular coverage area that has integrated within it, for example, a sectorized overlay of fixed mmWave directional beam patterns. An ability of the client device 200 to localize its position within the cellular coverage area may facilitate streamlined handoffs between sectors when operating in a mobile mmWave receiving mode.

The client device 200 may heterogeneously combine different individual radio devices within a single integrated package. As shown in FIG. 2, the different individual radio devices may include at least a cellular radio 260, a Wi-Fi radio 270 and a mmWave radio 280, each of which represents an external data communication interface for specific communication with different communication links available within the vicinity of the client device 200. The depiction in FIG. 2 represents only one combination of potential heterogeneous radio capabilities that may be housed in and employed by client device 200. Other combinations of individual radios in a client device 200 are contemplated.

All of the various components of the client device 200, as depicted in FIG. 2, may be connected by one or more data/control busses 290. The data/control bus(ses) 290 may provide internal wired or wireless communication between the various components of the client device 200, as all of those components are housed integrally in the client device 200.

It is anticipated that the various disclosed elements of the client device 200 may be arranged in combinations of sub-systems as individual components or combinations of components, but that, regardless of the specific configuration, all of the depicted components will be integral to a single unit that is the client device 200.

Figure 3:
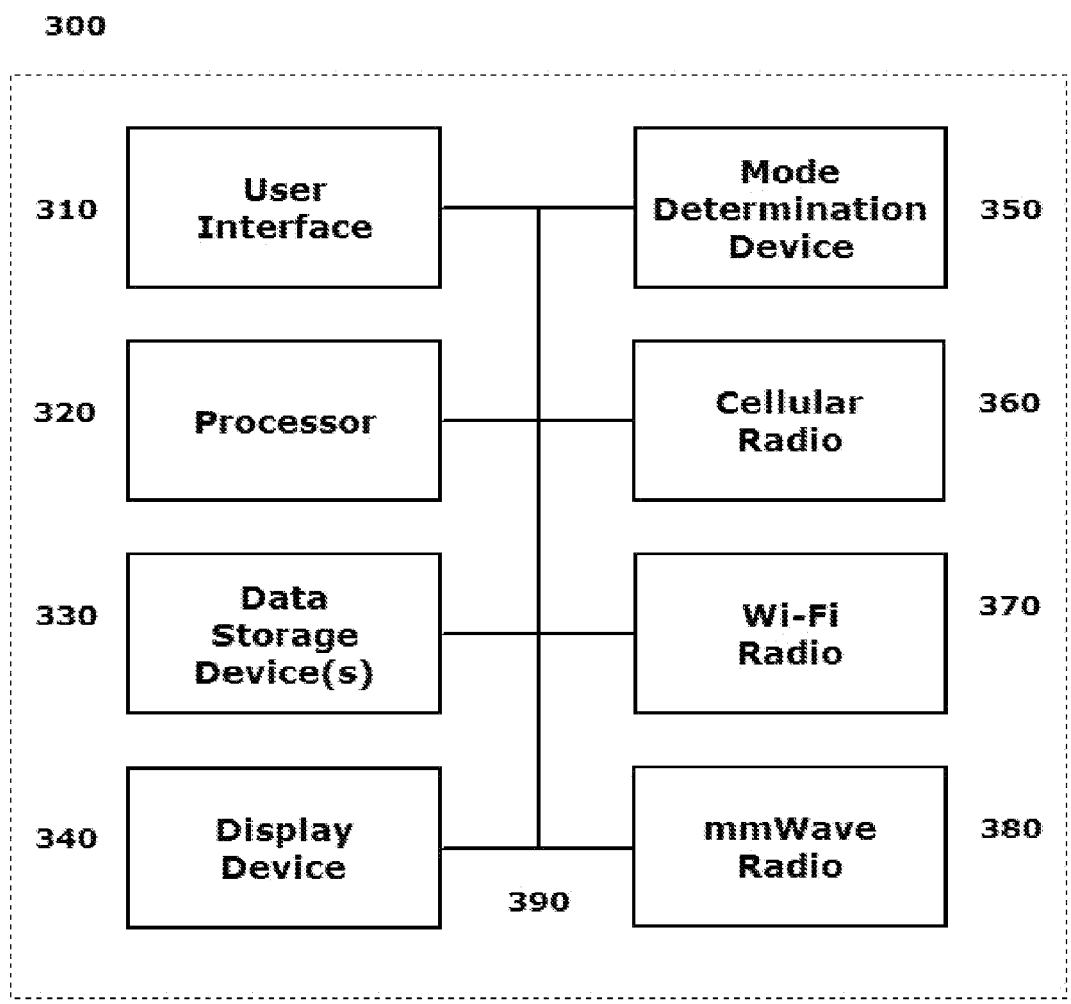
FIG. 3 illustrates a block diagram of an exemplary network node for integrating a mmWave communication link into a heterogeneous cellular/Wi-Fi communication system according to this disclosure.

FIG. 3 illustrates a block diagram of an exemplary network node 300 for integrating a mmWave communication link into a heterogeneous cellular/Wi-Fi communication system according to this disclosure.

The network node 300 may include its own user interface 310 by which a system administrator or other user may communicate with the other components of the network node 300. The user interface 310 in the network node 300 may include similar devices to those described above with reference to the user interface 210 in the client device 200. Alternatively, the user interface 310 may comprise a separate keyboard and mouse, or other user interface device such as, for example, a portable data storage medium and compatible data storage medium reader, that a system administrator or other user may employ to input data and/or instructions to the network node 300.

The network node 300 may include one or more processors 320 that are configured to carry into effect the determinations and control functions, including data routing and the determinations regarding where most appropriately to route the data throughout the integrated mmWave and cellular/Wi-Fi communication system. It is anticipated that most of the determinations regarding selection of an appropriate communication path by which to communicate with one or more client devices will be undertaken by the processor(s) 320 in the network node 300 based on information provided by the one or more client devices regarding capabilities of the one or more client devices and a content of the data requested by the one or more client devices.

The network node 300 may include one or more data storage devices 330. The data storage device(s) 330 may be used for static or dynamic storage of bulk data to be transmitted to one or more client devices. The data storage device(s) 330 may be segregated according to the type of data stored, or the communication link for which the data is stored. In this regard, for example, data packages that include movie downloads, high quality full HD and 3D stereo streaming, and other such large data packages that the network node 300 may choose to optimally transmit via the mmWave communication link to capable client devices, may be stored separately from other smaller size or lower data rate communication data packages. Such segregation may aid in directing the stored data packages to an appropriate communication link by the network node 300.

The network node 300 may include its own display device 340 that may be configured as a conventional display device by which to inform the user or system administrator regarding operation of the network node 300 and/or status of the communication links or client devices in communication with the network node for monitoring purposes.

The network node 300 may include a mode determination device 350 by which the network node 300 may communicate directly with one or more client devices and receive information regarding (1) the radio or communication link capabilities of a particular client device, and (2) a mode of operation of the particular client device as either a fixed or mobile unit. This mode determination device 350 may operate in conjunction with the processor(s) 320 to determine a proper mix on transmission over the various communication links controlled by the network node 300.

The network node 300 may heterogeneously combine different individual radio devices as an integrated communication link package controlled by the network node 300. As shown in FIG. 3, the different individual radio devices that the network node 300 may employ to establish the multiple communication links may include at least a cellular radio 360, a Wi-Fi radio 370 and a mmWave radio 380, each of which may comprise one or multiple radios and may represent an external data communication interface for specific communication with different communication links available within the broadcast area that the network node 300 covers.

All of the various components of the network node 300, as depicted in FIG. 3, may be connected by one or more data/control busses 390. The data/control busse(s) 390 may provide wired or wireless communication between the various components of the network node 300, whether locally housed together in a single facility or remotely dispersed in multiple individual facilities.

It should be appreciated that, although depicted in FIG. 3 as an integral unit, the various disclosed elements of the network node 300 may be arranged in any combination of sub-systems as individual components or combinations of components, housed in a single location or remotely dispersed in multiple locations and in wired or wireless communication with other of the individual components of the network node 300. In other words, no specific configuration as an integral unit or as a support unit, or as several units or sub-systems widely dispersed, for the network node 300 is to be implied by the depiction in FIG. 3.

The disclosed embodiments may include a method for operating an integrated mmWave communication link in a heterogeneous cellular/Wi-Fi communication system. The method may include obtaining an indication from a client device regarding on which one or more available communication links the client device is capable of communicating. The method may then make a determination based on the information provided regarding whether the client device is capable of receiving data via a mmWave communication link. If a determination is made that the client device is not capable of receiving data via the mmWave communication link, further processing regarding the mmWave communication link may be ignored for that particular client device and all communications may be transmitted via a non-mmWave communication link. If a determination is made that the client device is capable of receiving data via the mmWave communication link, the method may obtain a data request from the client device. The method may make a determination regarding whether the requested data is best, or otherwise most appropriately, transmitted via the mmWave communication link. If a determination is made that the requested data is not of a volume, or to be transmitted at a data rate, that would require use of the mmWave communication link, further processing regarding the mmWave communication link may be ignored regarding that particular data request and all communication may be transmitted via a non-mmWave communication link. If a determination is made that the requested data is of a volume, or to be transmitted at a data rate, that would best, or most appropriately be facilitated by use of the mmWave communication link, the method may then obtain information regarding a position of the client device by any available means in order to select an appropriate fixed directional beam from among multiple fixed directional beams to transmit the data across the mmWave communication link to the client device. With this information, the method may commence transmission of the data across the mmWave communication link. The method may separately make a determination whether the client device is operating in a fixed or mobile mode. This information may be obtained from the client device. If a determination is made that the client device is operating a fixed mode, transmission of the data across the mmWave communication link may continue until the transmission is complete. If a determination is made that the client device is operating in a mobile mode, additional processing within the network node may be undertaken, including obtaining or tracking information provided by the client device, to effect optimal sector handoff, for example, between different sectors covered by the multiple fixed directional beams of the mmWave communication link. This communication may likely be undertaken via a cellular link. Once the requested transmission via either communication link is complete the method may cease operation, or otherwise return to the start of the method.

Figure 4:
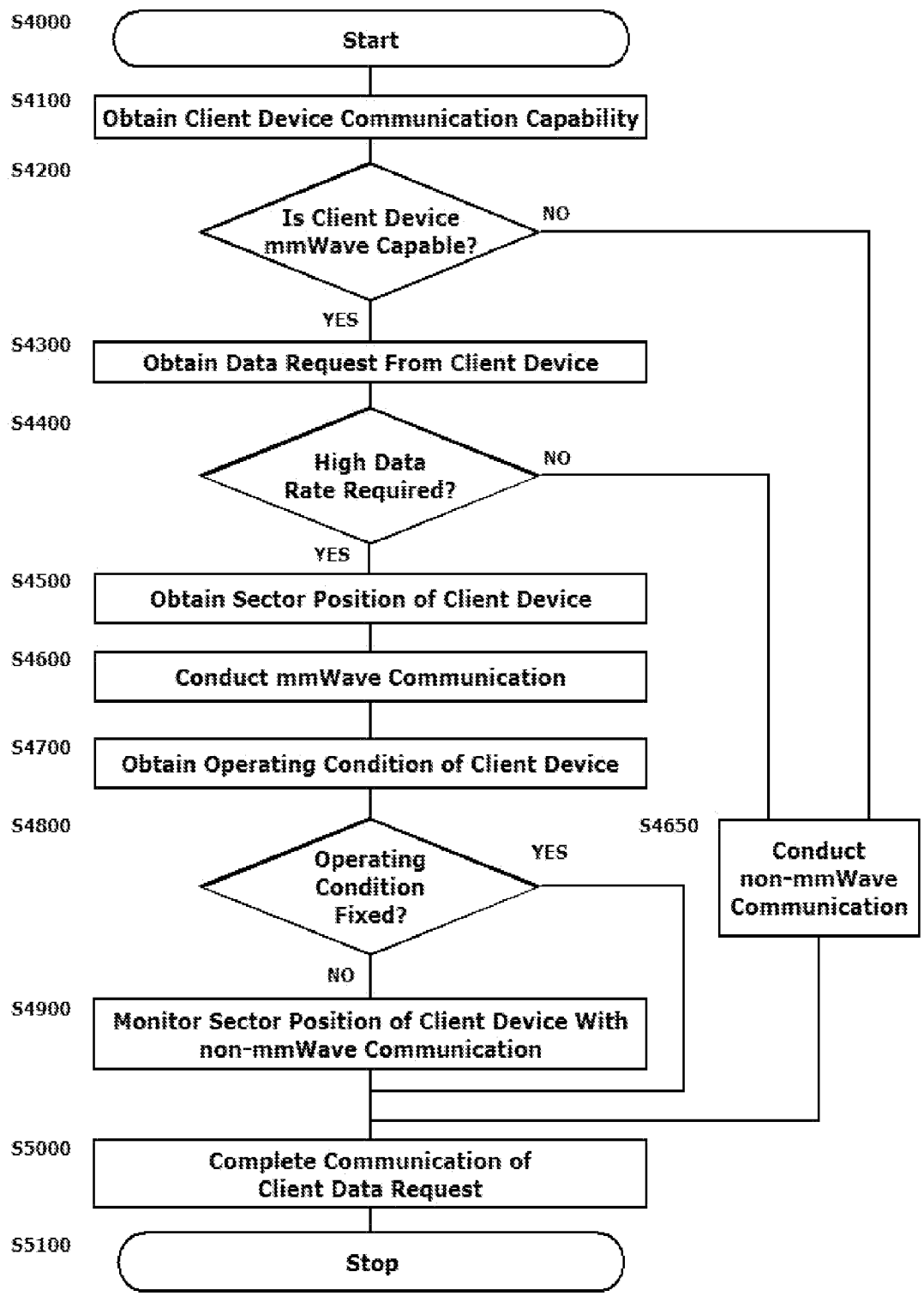
FIG. 4 illustrates a flowchart of an exemplary method for intelligently operating an integrated mmWave communication link in a heterogeneous cellular/Wi-Fi communication system according to this disclosure.

FIG. 4 illustrates a flowchart of an exemplary method for operation of an integrated mmWave communication link in a heterogeneous cellular/Wi-Fi communication system according to this disclosure. As shown in FIG. 4, operation of the method commences at Step S4000 and proceeds to Step S4100.

In Step S4100, a capability for a client device to communicate via various communication links is obtained. This information may be obtained by, for example, a network node sending a query to the client device. The client device may respond based on information stored in one or more storage devices in the client device regarding its communication capabilities, or otherwise the client device may respond based on information input by the user of the client wireless device via a user interface on the client device in response to the query. Operation of the method proceeds to Step S4200.

Step S4200 is a determination step. In Step S4200, a determination is made, based on information provided by the client device, whether the particular client device is capable of conducting communications across a mmWave communication link.

If, in Step S4200, it is determined that the particular client device is not capable of conducting communications across the mmWave communication link, operation of the method proceeds to Step S4650 where all further communications may be undertaken by a non-mmWave communication link.

If, in Step S4200, it is determined that the particular client device is capable of conducting communications across the mmWave communication link, operation of the method proceeds to Step S4300.

In Step S4300, a data request transmission may be received from the particular client device. Operation of the method proceeds to Step S4400.

Step S4400 is a determination step. In Step S4400, a determination is made, based on the data request received from the client device, whether the data transmission requested is most appropriately reserved to the mmWave communication link. This determination may be made based on the type of data request. For example, movie downloads, high-quality HD, 3D stereo streaming, and other data downloads that are of large volume or would benefit from a high data rate transmission to the client device, would be considered appropriate candidates for transmission across the mmWave communication link.

If, in Step S4400, it is determined that the data transmission requested is most appropriately reserved to communication links other than the mmWave communication link, operation of the method proceeds to Step S4650 where all further communications may be undertaken by a non-mmWave communication link.

If, in Step S4400, it is determined that the data transmission requested is most appropriately reserved to the mmWave communication link, operation of the method proceeds to Step S4500.

In Step S4500, particularly when the network node operates in multiple sectorized fixed directional beam mmWave communication link, a current position of the client device may be obtained by any available means. The current position of the client device will aid in facilitating a determination regarding on which of the fixed directional beams of the mmWave communication link the data requested by the client device should be transmitted. Operation of the method proceeds to Step S4600.

In Step S4600, a network node may transmit the high-volume or high data rate data requested by the client device over the mmWave communication link. Operation of the method proceeds to Step S4700.

In Step S4700, an operating condition, or operating mode, of the client device may be obtained to determine, for example, whether the client device is operating in a fixed or mobile condition/mode. Operation the method proceeds to Step S4800.

Step S4800 is a determination step. In Step S4800, a determination is made whether the client device is operating in a fixed condition/mode.

If, in Step S4800, it is determined that the client device is operating in a fixed mode, operation the method proceeds to Step S5000.

If, in Step S4800, it is determined that the client device is operating in a mobile mode, operation the method proceeds to Step S4900.

In Step S4900, the network node may employ communication from a non-mmWave communication link to aid in tracking a moving current position of the client device, and to effect optimal handoff between sectors in the multiple sectorized fixed directional beam transmission pattern of the mmWave communication link. Operation of the method proceeds to Step S5000.

In Step S5000, communication responding to the user data request from the client device continues until the communication is complete at which point the operation of the method proceeds to step S5100, where operation of the method ceases.

The disclosed embodiments may include a non-transitory computer-readable medium storing instructions which, when executed by a processor, may cause the processor to execute the steps of a method as outlined above concerning network node 300, and as described in detail in FIG. 4 and steps S4000 through S5100.

The above-described exemplary systems and methods reference certain conventional components to provide a brief, general description of a suitable communication and processing environment in which the subject matter of this disclosure may be implemented for familiarity and ease of understanding. Although not required, embodiments of the disclosure may be provided, at least in part, in a form of hardware circuits, firmware or software computer-executable instructions to carry out the specific functions described, such as program modules, being executed by a processor. Generally, program modules include routine programs, objects, components, data structures, and the like that perform particular tasks or implement particular data types.

Those skilled in the art will appreciate that other embodiments of the disclosed subject matter may be practiced in communication network environments with many types of heterogeneous communication equipment and computing system configurations, particularly in hand-held or otherwise portable client devices, multi-processor systems, microprocessor-based or programmable consumer electronics, and the like as the client device.

Embodiments may also be practiced in distributed network communication environments where tasks are performed by local and remote processing devices, generally as outlined above, that are linked to each other by hardwired links, wireless links, or a combination of both through a communication network. In a distributed network environment, program modules may be located in both local and remote data storage devices.

Embodiments within the scope of the present disclosure may also include computer-readable media having stored computer-executable instructions or data structures that can be accessed, read and executed by the user wireless device using a compatible wireless data reader. Such computer-readable media can be any available media that can be accessed by a processor in, or in communication with, the user wireless device. By way of example, and not limitation, such computer-readable media can comprise RAM, ROM, EEPROM, CD-ROM, DVD-ROM, flash drives, thumb drives, data memory cards or other analog or digital data storage devices that can be used to carry or store desired program elements or steps in the form of accessible computer-executable instructions or data structures. When information is transferred or provided over a network or another communications connection the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a network components, any wireless client device, or a processor in either of the network node or the client device, to perform certain of the above-specified functions, individually, or in combination. Computer-executable instructions also include program modules that are remotely stored for access by the client device to be executed by processors in the client device when that device is caused to communicate in the disclosed network environment across any communication link such as those depicted and described in exemplary manner above.

The exemplary depicted sequence of executable instructions, or associated data structures for executing those instructions, represents one example of a corresponding sequence of acts for implementing the functions described in the steps. The steps of the method, as depicted, are not intended to imply any particular order to the depicted steps except as may be necessarily inferred when one of the depicted steps is a necessary precedential condition to accomplishing another of the depicted steps.

Although the above description may contain specific details, they should not be construed as limiting the claims in any way. Other configurations of the described embodiments of the disclosed systems and methods are part of the scope of this disclosure. For example, the principles of the disclosure may be applied to each individual client device operating in a particular network node's coverage area where each client device may individually and independently operates within the depicted and described system. This enables each user to use the benefits of the disclosure even if any one of the large number of possible applications do not need a specific aspect of the functionality described and depicted in this disclosure. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A method for integrating different communication techniques in a wireless network environment, comprising:
   receiving a response from a client device regarding its communication capabilities in the wireless network environment,
   wherein the communication capabilities obtained from the client device comprise which wireless communication links the client device is capable of communicating with;
   determining based on the response provided by the client device whether the client device is capable of conducting communications across a mmWave communication link;
   obtaining a data transmission request from the client device;
   determining, with a processor, which one of a low data rate wireless communication link and a high data rate wireless communication link is used to transmit data requested by the data transmission request based on the response regarding communicating capabilities of the client device and a content of the data requested by the data transmission request;
   wherein the content of the data requested by the data transmission request is a data download that would benefit from high data rate transmission to the client device;
   obtaining information from the client device regarding whether the client device is being operated in a fixed or mobile mode;
   in response to the client device being operated in a mobile mode, then monitor sector position of the mobile device using a low data rate wireless communication link; and
   transmitting the data requested by data transmission request to the client device via the determined one of the low data rate wireless communication link and the high data rate wireless communication link;
   selecting, by the processor, one of a plurality of fixed directional beam patterns for transmitting the data requested by data transmission request to the client device via the mmWave communication link based on the obtained position of the client device;
   wherein return transmissions from the client device are received via at least one of a cellular or a Wi-Fi communication link;
   using the at least one of the cellular or the Wi-Fi communication link to update the position of the client device when the information indicates that the client device is operating in the mobile mode of operation;
   determining, with the processor, an optimal point for handoff of mmWave communications between the one of the plurality of fixed directional beam patterns and an other of the plurality of fixed directional beam patterns based on the updated position of the client device;
   storing data content in a segregated manner in at least one data storage device, wherein the data content is segregated according to whether the data content is transmitted by the low data rate wireless communication link or the high data rate wireless communication link.

2. The method of claim 1, wherein:
the low data rate wireless communication link is at least one of the cellular or the Wi-Fi communication link; and
the high data rate wireless communication link is the millimeter wave (mmWave) communication link.

3. The method of claim 2, wherein the mmWave communication link comprises a plurality of fixed directional beam patterns.

4. The method of claim 3, wherein:
the processor determines that the mmWave communication link is used to transmit data requested by the data transmission request, and
the method further comprises:
obtaining a position of the client device within the wireless network environment.

5. The method of claim 1, wherein when the content of the data requested by the data transmission request includes one of a movie download, a high-quality HD download, a 3D stereo streaming download, or an other data download, the processor determines that the high data rate wireless communication link is used to transmit the data requested by the data transmission request.

6. A system for integrating different communication techniques in a wireless network environment, comprising:
at least one low data rate wireless communication link;
at least one high data rate wireless communication link;
a processor at a network node, the processor being programmed to
receive a response from a client device regarding its communication capabilities in the wireless network environment;
obtain communicating capabilities from the response of the client device operating in the wireless network environment, wherein the communicating capabilities obtained from the client device comprise which wireless communication links the client device is capable of communicating with,
determine based on the response provided by the client device whether the client device is capable of conducting communications across a mmWave communication link;
obtain a data transmission request from the client device,
determine which one of a low data rate wireless communication link and a high data rate wireless communication link is used to transmit data requested by the data transmission request based on the obtained communicating capabilities of the client device and a content of the data requested by the data transmission request,
wherein the content of the data requested by the data transmission request is a data download that would benefit from high data rate transmission to the client device;
obtain information from the client device regarding whether the client device is being operated in a fixed or mobile mode of operation,
use the low data rate wireless communication link to update a position of the client device when the information indicates that the client device is operating in the mobile mode of operation, and
direct the transmitting of the data requested by data transmission request to the client device via the determined one of the low data rate wireless communication link and the high data rate wireless communication link;
wherein the mmWave communication link comprises a plurality of fixed directional beam patterns;
wherein the processor is further programmed to obtain a position of the client device, and when directing the transmitting of the data requested by data transmission request to the client device via the mmWave communication link, to select one of the plurality of fixed directional beam patterns based on the obtained position of the client device;
wherein the processor is further programmed to determine an optimal point for handoff of the mmWave communication link between the one of the plurality of fixed directional beam patterns and an other of the plurality of fixed directional beam patterns based on the updated position of the client device;
wherein when the content of the data requested by the data transmission request includes a request for one of a movie download, a high-quality HD download, a 3D stereo streaming download, or an other data download, the processor determines that the high data rate wireless communication link should be used to transmit data requested by the data transmission request.

7. The system of claim 6, wherein:
the low data rate wireless communication link is at least one of a cellular or a Wi-Fi communication link; and
the high data rate wireless communication link is the millimeter wave (mmWave) communication link.

8. The system of claim 7, further comprising at least one client device communicating with the network node via the at least one of the cellular or the Wi-Fi communication link, and the mmWave communication link.

9. The system of claim 8, wherein, regardless of whether the at least one client device receives the data requested by data transmission request via the at least one of the cellular or the Wi-Fi communication link, or the mmWave communication link, the at least one client device transmits information to the network node via the at least one of the cellular or the Wi-Fi communication link.

10. The system of claim 6, further comprising at least one data storage device in communication with the processor at the network node, the at least one storage device being segregated such that the data content is separately stored according to whether the data content is transferred by the at least one low data rate wireless communication link or the at least one high data rate wireless communication link.

11. A non-transitory computer-readable medium storing computer-readable instructions which, when executed by a processor, causes the processor to execute a method for integrating different communication techniques in a wireless network environment, the method comprising:
receiving a response from a client device regarding its communication capabilities in the wireless network environment;
obtaining communicating capabilities from the response of the client device operating in the wireless network environment, wherein the communicating capabilities obtained from the client device comprise which wireless communication links the client device is capable of communicating with;
determining based on the response provided by the client device whether the client device is capable of conducting communications across a mmWave communication link;
obtaining a data transmission request from the client device;
determining, with a processor, which one of a low data rate wireless communication link and a high data rate wireless communication link is used to transmit data requested by the data transmission request based on the obtained communicating capabilities of the client device and a content of the data requested by the data transmission request, wherein the content of the data requested by the data transmission request is a data download that would benefit from high data rate transmission to the client device;

obtaining information from the client device regarding whether the client device is being operated in a fixed or mobile mode, and in response to the client device being operated in a mobile mode, then monitor sector position of the mobile device using a low data rate wireless communication link; and transmitting the data requested by data transmission request to the client device via the determined one of the low data rate wireless communication link and the high data rate wireless communication link, wherein:

the low data rate wireless communication link is at least one of a cellular or a Wi-Fi communication link; and the high data rate wireless communication link is a millimeter wave (mmWave) communication link;

storing data content in a segregated manner in at least one data storage device, wherein the data content is segregated according to whether the data content is transmitted by the low data rate wireless communication link or the high data rate wireless communication link.

\* \* \* \* \*